United States Patent
Hernandez et al.

(10) Patent No.: US 11,031,200 B2
(45) Date of Patent: Jun. 8, 2021

(54) RELAY CYCLE LIFE EXTENDER

(71) Applicant: Ademco Inc., Golden Valley, MN (US)

(72) Inventors: Ever Hernandez, Chihuahua (MX);
Tracy Lentz, Minneapolis, MN (US);
Jean Rouillard, St. Francis, MN (US)

(73) Assignee: Ademco Inc., Golden Valley, MN (US)

( * ) Notice: Subject to any disclaimer, the term of this patent is extended or adjusted under 35 U.S.C. 154(b) by 169 days.

(21) Appl. No.: 16/138,830

(22) Filed: Sep. 21, 2018

(65) Prior Publication Data
US 2019/0096613 A1     Mar. 28, 2019

Related U.S. Application Data

(60) Provisional application No. 62/562,160, filed on Sep. 22, 2017.

(51) Int. Cl.
*H01H 47/00* (2006.01)
*H01H 9/54* (2006.01)
*G05B 19/042* (2006.01)

(52) U.S. Cl.
CPC .......... *H01H 47/001* (2013.01); *H01H 9/542* (2013.01); *G05B 19/042* (2013.01); *G05B 2219/25257* (2013.01)

(58) Field of Classification Search
CPC .... H01H 47/001; H01H 9/542; G05B 19/042; G05B 2219/25257
USPC .............................................. 307/115; 361/8
See application file for complete search history.

(56) References Cited

U.S. PATENT DOCUMENTS

| | | | | |
|---|---|---|---|---|
| 8,582,262 B2* | 11/2013 | Divan | .................... | H02H 3/025 361/58 |
| 2002/0080630 A1* | 6/2002 | Hodge, Jr. | ............. | H02H 9/001 363/50 |
| 2011/0102052 A1* | 5/2011 | Billingsley | ............ | H01H 9/542 327/365 |
| 2012/0025802 A1* | 2/2012 | Carmen | ................. | H05B 45/37 323/320 |
| 2013/0127518 A1* | 5/2013 | Nakao | ..................... | H02M 1/36 327/434 |
| 2014/0333311 A1* | 11/2014 | Liu | ..................... | G01R 19/0038 324/418 |

(Continued)

OTHER PUBLICATIONS

"TH115-A-/F/AF User Guide," by Aube Technologies, accessed May 4, 2017, 3 pp.

(Continued)

*Primary Examiner* — Michael R. Fin
(74) *Attorney, Agent, or Firm* — Shumaker & Sieffert, P.A.

(57) ABSTRACT

A relay assembly that includes a relay, a bypass switch and a controller. The relay includes an electromechanical switch with an open state and a closed state. The bypass switch is operatively coupled in parallel with the electromechanical switch of the relay, and also has an open state and a closed state. The controller is operatively coupled to the relay and the bypass switch, and is configured to switch the bypass switch from the open state to the closed state, then switch the relay between the open state and closed state, and then switch the bypass switch back to the open state. In some cases, the bypass switch includes a TRIAC. The controller may be configured to maintain the bypass switch in the closed state for less than 100 milliseconds before switching back to the open state.

19 Claims, 9 Drawing Sheets

(56) References Cited

U.S. PATENT DOCUMENTS

2017/0229269 A1\* 8/2017 Smith .................. H01H 47/325
2018/0006446 A1\* 1/2018 Guo ....................... H02H 9/001

OTHER PUBLICATIONS

"TH232-AF-230 Installation Instructions," by Aube Technologies, accessed May 4, 2017, 4 pp.

\* cited by examiner

| Close Contacts | K1 | Bypass |
|---|---|---|
| $T_A$ | Open | Open |
| $T_B$ | Open | Close |
| $T_C$ | Close | Close |
| $T_D$ | Close | Open |

FIG. 1B

| Open Contacts | Bypass | Open | Close | Close | Open |
|---|---|---|---|---|---|
| K1 | Close | Close | Open | Open | |
| | $T_A$ | $T_B$ | $T_C$ | $T_D$ | |

FIG. 1C

| Close Contacts | K1 | T1 | K2 |
|---|---|---|---|
| $T_A$ | Open | Open | Open |
| $T_B$ | Open | Open | Close |
| $T_C$ | Open | Close | Close |
| $T_D$ | Close | Close | Close |
| $T_E$ | Close | Open | Close |

FIG. 3B

| Open Contacts | K1 | T1 | K2 |
|---|---|---|---|
| $T_A$ | Close | Open | Close |
| $T_B$ | Close | Close | Close |
| $T_C$ | Open | Close | Close |
| $T_D$ | Open | Open | Close |
| $T_E$ | Open | Open | Open |

FIG. 3C

RELAY CYCLE LIFE EXTENDER

This application claims the benefit of U.S. Provisional Application Ser. No. 62/562,160, filed Sep. 22, 2017 entitled "RELAY CYCLE LIFE EXTENDER", which is incorporated by reference herein in its entirety.

TECHNICAL FIELD

The present disclosure relates generally to relays, and more particularly to methods and devices for extending the cycle life of relays.

BACKGROUND

Relays are used in a wide variety of application, such as where it is necessary to control a higher power circuit or device using a separate low-power signal, or where several circuits must be controlled by one signal. A relay is an electrically operated switch Many relays use an electromagnet to mechanically operate a switch, but other operating principles are also used, such as solid-state relays. One particular application that relays are used is in building control applications. For example, a battery powered thermostat typically generates a relatively low voltage control signal that controls a relay. The relay switches a higher voltage signal to a load such as a fan, a blower, an AC compressor, or the like. In another example, a steam humidifier typically consumes a significant current to heat water and produce steam for the humidifier. A relay may be used to switch the current on and off to a heating element based on a control signal.

When relays are switched open while carrying a significant current, or switched closed and suddenly carry a significant current, the current can cause a significant reduction in the number of open/close cycles that the relay can achieve before failure. The current can cause excessive arcing at the contacts, weld the contact together over time, cause electro-migration issues at the contacts, as well as have other deleterious effects. The lifetime of a typical electromechanical relay may be limited to 100,000 cycles when switched under a substantial load current. Under typical or heavy load conditions, the higher the load current, the fewer number of open/close cycles that can be expected before failure.

What would be desirable is a method and system for extending the number of open/close cycles that a relay can perform before failure. This would be particular advantageous in those applications where higher relay cycles are expected, such as in some steam humidifier applications (e.g. 30 times per hour).

SUMMARY

Generally, the present disclosure relates to methods and systems for extending the number of open/close cycles that a relay can perform before failure. In one example, a relay includes an electromechanical switch that has an open state and a closed state. In the closed state, the electromechanical switch is closed across the switch contacts and current can pass from an input port of the relay to an output port. In the open state, the electromechanical switch is open across the switch contacts and current cannot pass from the input port of the relay to the output port. A control input is used to control the state of the electromechanical switch. In some cases, the control input may pass a control current though a coil of an electromagnet, which then magnetically sets the electromechanical switch to a particular state. In some cases, relay may be a normally open relay, where the control current must be present to set the electromechanical switch to the closed state, or a normally closed relay, where the control current must be present to set the electromechanical switch to the open state. In some cases, the relay may be a latching relay wherein the control current is only applied to change the state of the electromechanical switch. In such cases, the control current may have a first polarity to set the electromechanical switch to the open state and a second polarity to set the electromechanical switch to the closed state. Regardless of the type of relay, a bypass switch may be connected between the input port of the relay and the output port. The bypass switch is temporarily activated to temporarily divert at least some current around the relay (bypass the relay) while the relay switches states. Once the relay switches states, the bypass switch is deactivated. This may help reduce the current that would otherwise abruptly flow or stop flowing through the electromechanical switch of the relay when the relay is changing states. This can substantially increase the number of open/close cycles that the relay can achieve before failure, thereby extending the expected lifetime of the relay.

When the electromechanical switch of the relay is open and it is desirable to switch the electromechanical switch closed, the electromechanical switch and the bypass switch may both be initially open. The bypass switch may then be closed while the electromechanical switch of the relay remains open. This will allow current to temporarily flow through the bypass switch. Then, with the bypass switch closed, the electromechanical switch may be closed. This will allow current to flow through both the electromechanical switch and the bypass switch (i.e. dividing the current). Thus, the current that will abruptly rush through the electromechanical switch of the relay upon closure will be substantially reduced because some of the current will be passing through the bypass switch. Then, the bypass switch may be opened, allowing all of the current to flow through the electromechanical switch of the relay.

When the electromechanical switch of the relay is closed and it is desirable to switch the electromechanical switch open, the electromechanical switch may initially be closed and the bypass switch may initially be open. The bypass switch may then be closed while the electromechanical switch of the relay remains closed. This will allow current to temporarily flow through the bypass switch as well as the electromechanical switch (i.e. dividing the current). Thus, the current that will abruptly stop flowing through the electromechanical switch of the relay upon opening will be substantially reduced because some of the current will be passing through the bypass switch. Then, the electromechanical switch may be opened, allowing all of the current to flow through the bypass switch. Then, the bypass switch may be opened.

In some cases, the bypass switch may not be able to sustain the level of current for an extended period of time without overheating or becoming damaged. For example, the bypass switch may include a TRIAC that can only carry the full current load of the relay for a relatively short period of time without overheating and/or becoming damaged. As such, the bypass switch may remain closed for only a relatively short time period during which the electromechanical switch of the relay changes state as described above. The time that the bypass switch remains closed may be, for example, less than 1 second, less than 0.5 seconds, less than 0.25 seconds, less than 0.1 seconds, less than 90 milliseconds, less than 50 milliseconds, less than 25 milliseconds, less than 10 milliseconds, or any other suitable time period.

In some cases, a load such as a heater of a steam humidifier, may have a first power terminal and a second power terminal. The first power terminal may be connected to line voltage and the second power terminal may be connected to neutral. In some cases, the line voltage may be, for example 120V or 240V, and the load may be configured to draw 16 Amps of current. A first relay may selectively connect line voltage to the first power terminal of the load, and a second relay may selectively connect neutral to the second power terminal of the load. The first relay may be a normally open relay, and may include a first enable signal for closing the electromechanical switch of the first relay. The first enable signal may be active low. Likewise, the second relay may be a normally open relay, and may include a second enable signal for closing the electromechanical switch of the second relay. The second enable signal may be active low. A first TRIAC may be connected in parallel with the electromechanical switch of the first relay. The first TRIAC may have a first TRIAC enable signal that, when activated, closes the first TRIAC, allowing current to bypass the electromechanical switch of the first relay. A controller, such as a microcontroller, processor or the like, may be programmed to generate the first enable signal, the second enable signal and the first TRIAC enable signal.

When it is desirable to deliver current to the load, the first relay is initially open (i.e. the electromechanical switch of the first relay is open), the second relay is initially open (i.e. the electromechanical switch of the second relay is open), and the first TRIAC is initially open. The second relay may then be closed. No current will flow to the load because the first relay and the first TRIAC are still open. Next, the first TRIAC may be closed while the first relay remains open. This will allow current to flow through the already closed second relay and temporarily through the first TRIAC. Then, with the first TRIAC closed, the first relay may be closed. This will allow current to flow through the first relay and the first TRIAC (i.e. dividing the current), as well as the second relay. Thus, the current that abruptly rushes through the first relay upon closure will be substantially reduced because some of the current will be passing through the first TRIAC. Then, the first TRIAC may be opened, allowing all of the current to flow through the first relay, as well as the second relay.

When it is desirable to stop delivering current to the load, the first relay is initially closed, the second relay is initially closed, and the first TRIAC is initially open. The first TRIAC may then be closed, while the first relay remains closed. This will allow current to flow through the first relay and the first TRIAC (i.e. dividing the current), as well as the second relay. The first relay may then be opened while the first TRIAC remain closed. The current that abruptly stops flowing through the first relay upon opening will be substantially reduced because some of the current will be passing through the first TRIAC. Then, the first TRIAC may be opened, stopping all current delivery to the load. Finally, the second relay may be opened.

In some cases, a second TRIAC may be connected in parallel with the electromechanical switch of the second relay. The second TRIAC may have a second TRIAC enable signal that, when activated, closes the second TRIAC, allowing current to bypass the electromechanical switch of the second relay. The controller may also be programmed to generate the second TRIAC enable signal. When so provided, the second TRIAC may be used as a backup should the first TRIAC fail open. If the first TRIAC should fail open, the second TRIAC could be used in a similar manner as described above, except where the first relay and second relay are reversed. In some cases, the first TRIAC may be used as described above while the second TRIAC remains open, and then the second TRIAC may be used as described above (except where the first relay and second relay are reversed). In some cases, the first TRIAC may be used for a first open/close cycle, and then the second TRIAC may be used for a subsequent open/close cycle. This may further extend the number of open/close cycles that can be expected before failure.

The above summary of the present disclosure is not intended to describe each disclosed embodiment or every implementation of the present disclosure. The Figures, Detailed Description and Examples which follow more particularly exemplify these embodiments.

BRIEF DESCRIPTION OF THE FIGURES

The disclosure may be more completely understood in consideration of the following detailed description of various embodiments of the disclosure in connection with the accompanying drawings, in which:

FIG. 1B is a state diagram of an example operation of the relay cycle life extender of FIG. 1A;

FIG. 1C is a state diagram of another example operation of the relay cycle life extender of FIG. 1A;

FIG. 3B is a state diagram of an example operation of the relay cycle life extender of FIG. 3A;

FIG. 3C is a state diagram of another example operation of the relay cycle life extender of FIG. 3A.

Figure 1A:
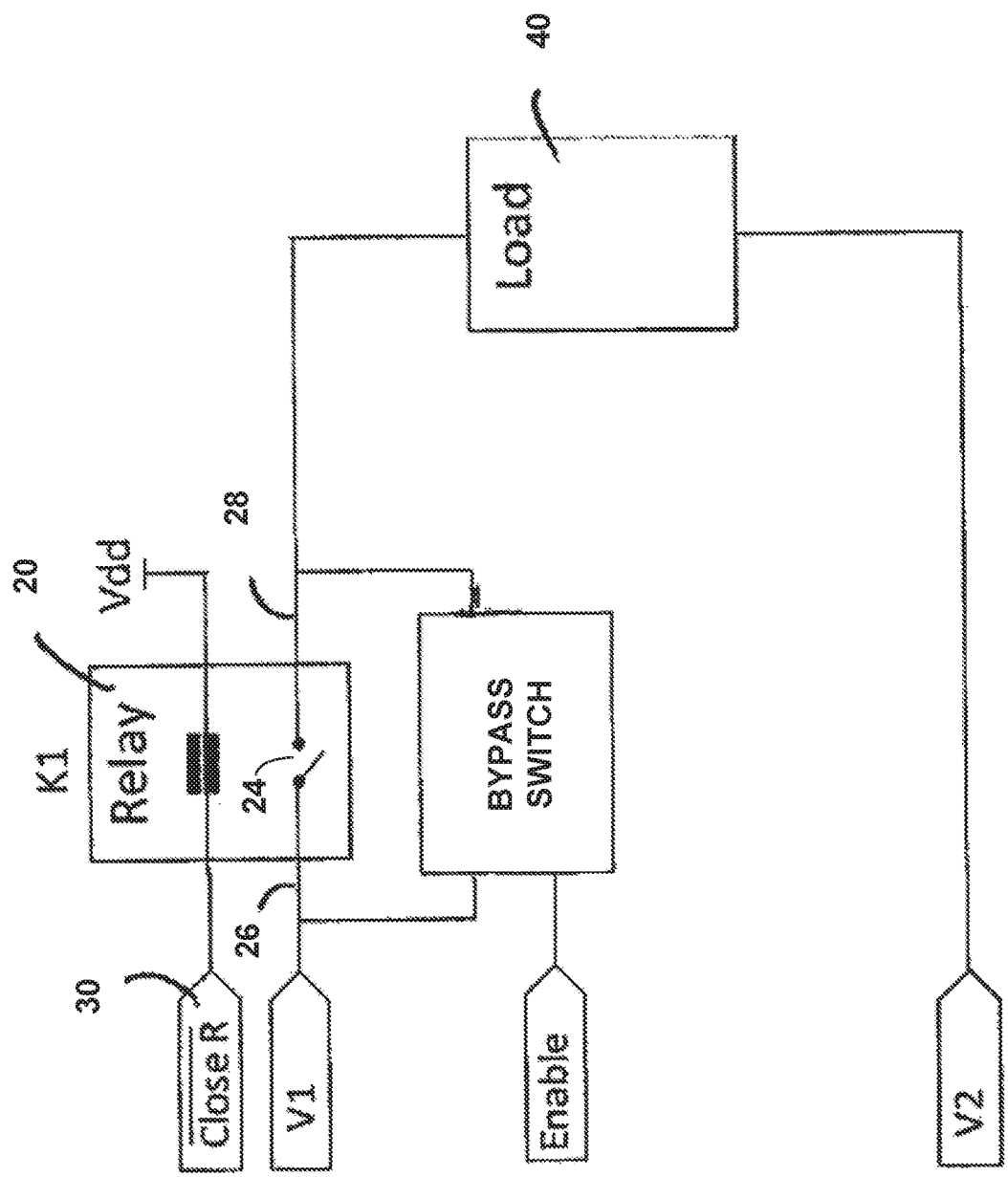
FIG. 1A is a schematic diagram of an illustrative relay cycle life extender.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected embodiments and are not intended to limit the scope of the disclosure. Although examples of construction, dimensions, and materials are illustrated for the various elements, those skilled in the art will recognize that many of the examples provided have suitable alternatives that may be utilized.

Generally, the present disclosure relates to methods and systems for extending the number of open/close cycles that a relay can perform before failure. FIG. 1A is a schematic diagram of an illustrative relay cycle life extender. The illustrative relay cycle life extender includes a relay 20 and a bypass switch 22 connected in parallel with the relay 20 to drive a load 40. The relay 20 includes an electromechanical switch 24 that has an open state and a closed state. In the closed state, the electromechanical switch is closed across the switch contacts and current can pass from an input port 26 of the relay 20 to an output port 28. In the open state, the electromechanical switch 24 is open across the switch contacts and current cannot pass from the input port 26 of the relay 20 to the output port 28. A control input 30 is used to control the state of the electromechanical switch 24. In some cases, the control input 30 may pass a control current though a coil of an electromagnet, which then magnetically sets the electromechanical switch 24 to a particular state. In some cases, relay 20 may be a normally open relay, where the control current must be present to set the electromechanical switch 24 to the closed state, or a normally closed relay, where the control current must be present to set the electromechanical switch 24 to the open state. In some cases, the relay 20 may be a latching relay wherein the control current is only applied to change the state of the electromechanical switch 24. In such cases, the control current may have a first polarity to set the electromechanical switch 24 to the open state and a second polarity to set the electromechanical switch 24 to the closed state. Regardless of the type of relay, bypass switch 22 may be connected in parallel with the relay 20 between the input port 26 and the output port 28. During operation the bypass switch 22 is temporarily activated to temporarily divert at least some current around the relay 20 (bypass the relay) while the relay 20 switches states. Once the relay 20 switches states, the bypass switch 22 is deactivated. This may help reduce the current that would otherwise abruptly flow or stop flowing through the electromechanical switch 24 of the relay 20 when the relay 20 is changing states. This can substantially increase the number of open/close cycles that the relay 20 can achieve before failure, thereby extending the expected lifetime of the relay 20.

FIG. 1B is a state diagram of an example operation of the relay cycle life extender of FIG. 1A, when switching the relay 20 from an open state to a closed state. Initially, the electromechanical switch 24 (K1) and the bypass switch 22 (Bypass) are both initially "open", as shown at time TA in columns labeled K1 and Bypass of FIG. 1B. The bypass switch 22 may then be closed while the electromechanical switch of the relay remains open, as shown at time TB. This will allow current to temporarily flow through the bypass switch 22. Then, with the bypass switch 22 closed, the electromechanical switch 24 may be closed, as shown at time TC. This will allow current to flow through both the electromechanical switch 24 and the bypass switch 22 (i.e. dividing the current). Thus, the current that will abruptly rush through the electromechanical switch 24 of the relay upon closure will be substantially reduced because some of the current will be passing through the bypass switch 22. Then, the bypass switch 22 may be opened, allowing all of the current to flow through the electromechanical switch 24 of the relay 20, as shown at time TD of FIG. 1B.

FIG. 1C is a state diagram of another example operation of the relay cycle life extender of FIG. 1A, when switching the relay 20 from a closed state to an open state. Initially, the electromechanical switch 24 may be closed and the bypass switch 22 may be open, as shown at time TA of FIG. 1C. The bypass switch 22 may then be closed while the electromechanical switch 24 of the relay 20 remains closed, as shown at time TB of FIG. 1C. This will allow current to temporarily flow through the bypass switch 22 as well as the electromechanical switch 24 (i.e. dividing the current). Thus, the current that will abruptly stop flowing through the electromechanical switch 24 of the relay 20 upon opening will be substantially reduced because some of the current will be passing through the bypass switch 22. Then, the electromechanical switch 24 may be opened, allowing all of the current to flow through the bypass switch 22, as shown at time TC of FIG. 1C. Then, the bypass switch 22 may be opened, as shown at time TD of FIG. 1C.

Figure 1D:
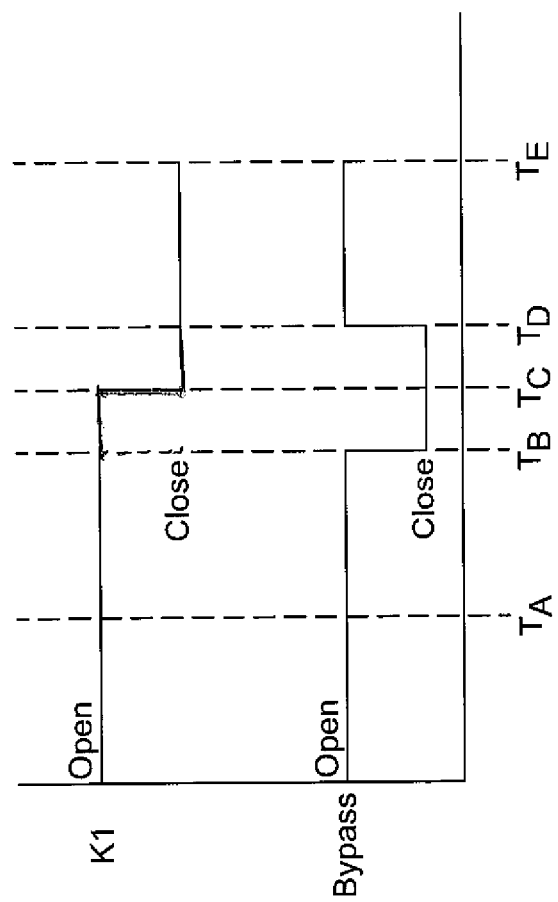
FIG. 1D is a timing diagram showing illustrative timing of the example operation of FIG. 1B.
Figure 2:
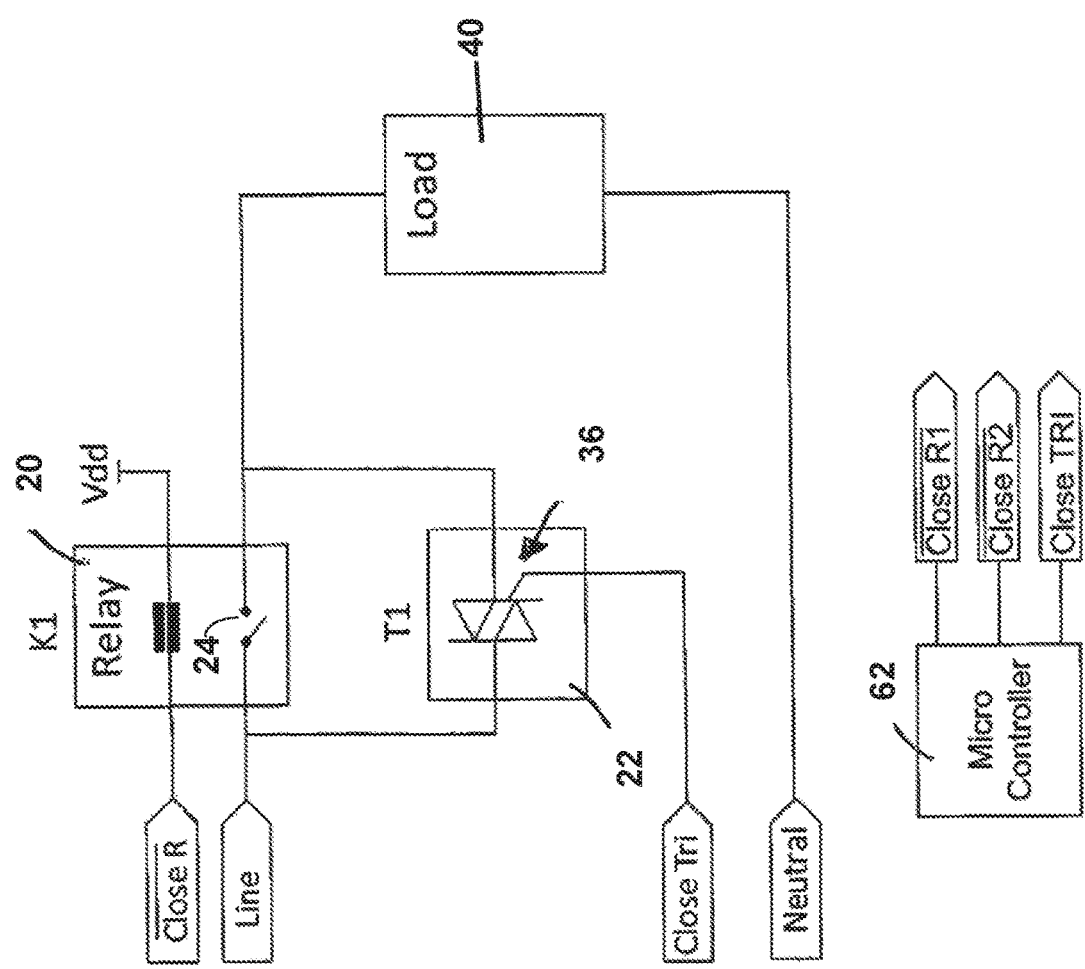
FIG. 2 is a schematic diagram of another illustrative relay cycle life extender.

In some cases, the bypass switch 22 may not be able to sustain the level of current for an extended period of time without overheating or becoming damaged. For example, the bypass switch 22 may include a TRIAC 36 (see FIG. 2A) that can only carry the full current load of the relay 20 for a relatively short period of time without overheating and/or becoming damaged. The illustrative relay cycle life extender of FIG. 2A operates similar to the illustrative relay cycle life extender of FIG. 1A-1D. In any event, the bypass switch 22 may remain closed for only a relatively short time period during which the electromechanical switch 24 of the relay 20 changes state as described above. This is illustrated in FIG. 1D. In some cases, the time between time TB and TD of FIG. 1D during which the bypass switch 22 remains closed may be, for example, less than 1 second, less than 0.5 seconds, less than 0.25 seconds, less than 0.1 seconds, less than 90 milliseconds, less than 50 milliseconds less than 25 milliseconds, less than 10 milliseconds, or any other suitable time period.

Figure 3A:
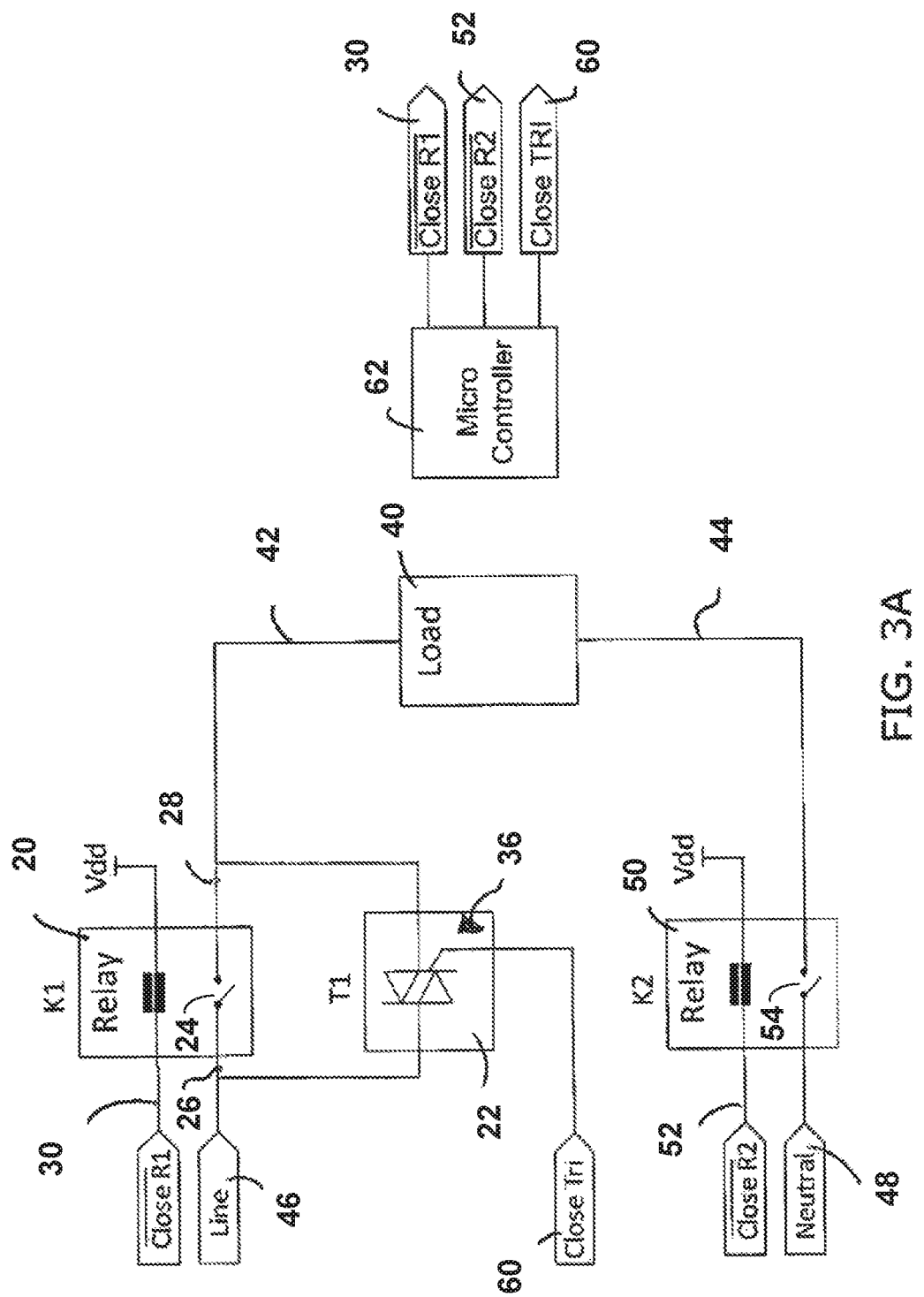
FIG. 3A is a schematic diagram of another illustrative relay cycle life extender.

FIG. 3A is a schematic diagram of another illustrative relay cycle life extender. In some cases, a load 40 such as a heater of a steam humidifier, may have a first power terminal 42 and a second power terminal 44. The first power terminal 42 may be connected to line voltage 46 and the second power terminal 44 may be connected to neutral 48. In some cases, the line voltage 46 may be, for example 120V or 240V, and the load 40 may be configured to draw 16 Amps of current.

A first relay 20 may selectively connect line voltage 46 to the first power terminal 42 of the load 40, and a second relay 50 may selectively connect neutral 48 to the second power terminal 44 of the load 40. The first relay 20 may be a normally open relay, and may include a first enable signal 30 for closing the electromechanical switch 24 of the first relay 20. The first enable signal 30 may be active low, but this is not required. Likewise, the second relay 50 may be a normally open relay, and may include a second enable signal 52 for closing the electromechanical switch 54 of the second relay 50. The second enable signal 52 may be active low, but this is not required. A first TRIAC 36 may be connected in parallel with the electromechanical switch 24 of the first relay 20. The first TRIAC 36 may have a first TRIAC enable signal 60 that, when activated, closes the first TRIAC 36, allowing current to bypass the electromechanical switch 24 of the first relay 20. A controller 62, such as a microcontroller, processor or the like, may be programmed to generate the first enable signal 30, the second enable signal 52 and the first TRIAC enable signal 60.

When it is desirable to deliver current to the load 40 and as shown at time TA in FIG. 3B, the first relay 20 is initially open (i.e. the electromechanical switch 24 of the first relay 20 is open), the second relay 50 is initially open (i.e. the electromechanical switch 54 of the second relay 50 is open), and the first TRIAC 36 is initially open. The second relay 50 may then be closed, as shown at time TB in FIG. 3B. No current will flow to the load 40 because the first relay 20 and the first TRIAC 36 are still open. Next, the first TRIAC 36 may be closed while the first relay 20 remains open, as shown at time TC in FIG. 3B. This will allow current to flow through the already closed second relay 50 and temporarily through the first TRIAC 36. Then, with the first TRIAC 36 closed, the first relay 20 may be closed, as shown at time TD in FIG. 3B. This will allow current to flow through the first relay 20 and the first TRIAC 36 (i.e. dividing the current), as well as the second relay 50. Thus, the current that abruptly rushes through the first relay 20 upon closure will be substantially reduced because some of the current will be passing through the first TRIAC 36. Then, the first TRIAC 36 may be opened as shown at time TE in FIG. 3B, allowing all of the current to flow through the first relay 20, as well as the second relay 50.

When it is desirable to stop delivering current to the load 40 and as shown at time TA in FIG. 3C, the first relay 20 is initially closed, the second relay 50 is initially closed, and the first TRIAC 36 is initially open. The first TRIAC 36 may then be closed, while the first relay 20 remains closed, as shown at time TB in FIG. 3C. This will allow current to flow through the first relay 20 and the first TRIAC 36 (i.e. dividing the current), as well as the second relay 50. The first relay 20 may then be opened while the first TRIAC 36 remains closed, as shown at time TC in FIG. 3C. The current that abruptly stops flowing through the first relay 20 upon opening will be substantially reduced because some of the current will be passing through the first TRIAC 36. Then, the first TRIAC 36 may be opened as shown at time TD in FIG. 3C, stopping all current delivery to the load 40. Finally, the second relay 50 may be opened, as shown at time TE in FIG. 3C.

Figure 4:
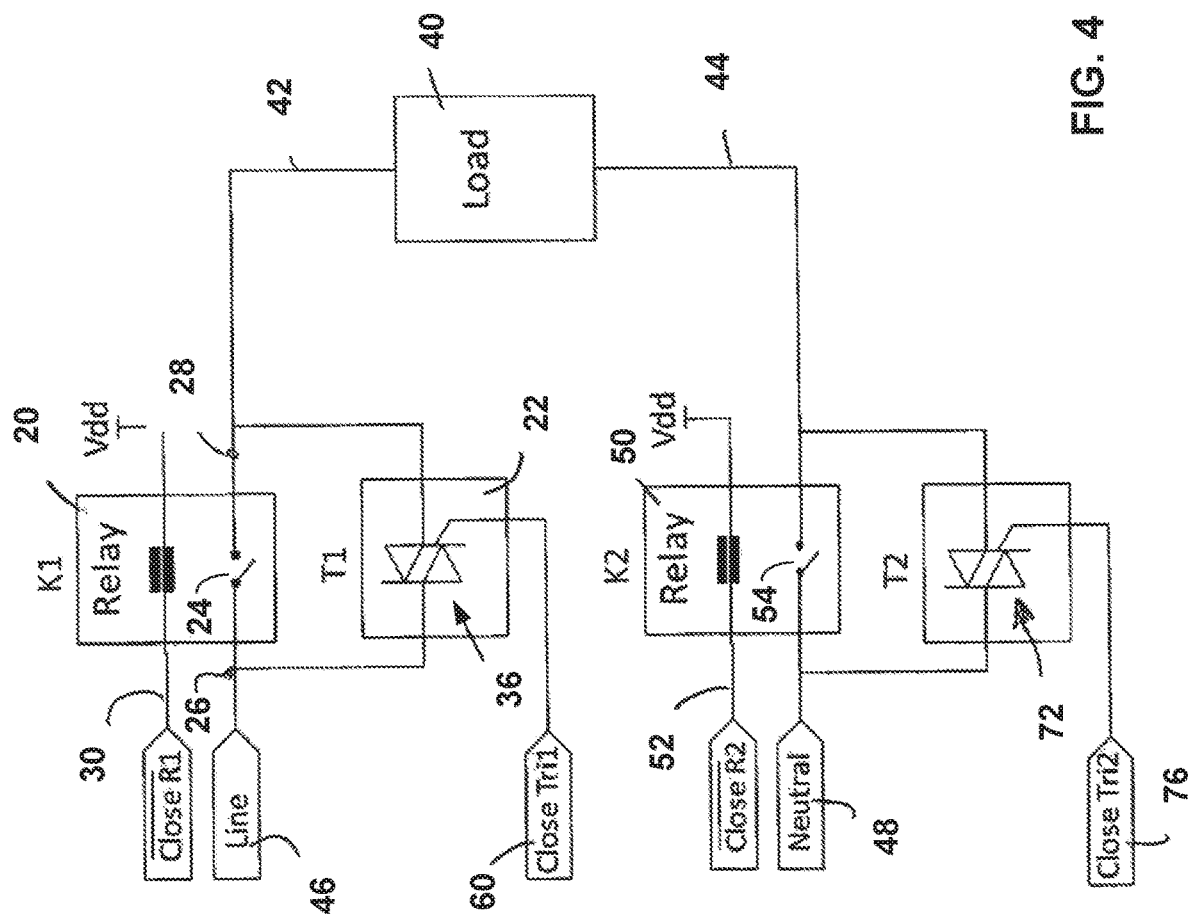
FIG. 4 is a schematic diagram of yet another illustrative relay cycle life extender.

In some cases, a second TRIAC 72 may be connected in parallel with the electromechanical switch 54 of the second relay 50, as shown in FIG. 4. The second TRIAC 72 may have a second TRIAC enable signal 76 that, when activated, closes the second TRIAC 72, allowing current to bypass the electromechanical switch 54 of the second relay 50. The controller 62 (see FIG. 3A) may also be programmed to generate the second TRIAC enable signal 76. When so provided, the second TRIAC 72 may be used as a backup should the first TRIAC 36 fail open. If the first TRIAC 36 should fail open, the second TRIAC 72 could be used in a similar manner as described above with respect to FIG. 3A-3C, except where the first relay 20 (K1) and second relay (K2) in FIGS. 3B-3C are reversed. In some cases, the first TRIAC 36 may be used as described above while the second TRIAC 72 remains open, and then the second TRIAC 72 may be used as described above (except where the first relay 20 (K1) and second relay (K2) in FIGS. 3B-3C are reversed) before returning again to using the first TRIAC 36. In some cases, the first TRIAC 36 may be used for a first open/close cycle, and then the second TRIAC 72 may be used for a second open/close cycle, and then the first TRIAC 36 may be used for a third open/close cycle. Alternating the use of the first TRIAC 36 and second TRIAC 72 in an alternating manner, may further extend the number of open/close cycles that can be expected before failure.

The disclosure should not be considered limited to the particular examples described above, but rather should be understood to cover all aspects of the disclosure as set out in the attached claims. Various modifications, equivalent processes, as well as numerous structures to which the disclosure can be applicable will be readily apparent to those of skill in the art upon review of the instant specification.

What is claimed is:

1. A relay assembly configured to control an electrical current to a load, the relay assembly comprising:
   a first current path comprising an electromechanical switch of the relay assembly;
   a second current path comprising a bypass switch, wherein the second current path is in parallel to the first current path;
   wherein:
      the bypass switch is bi-directional;
      the bypass switch is operatively coupled in parallel with the electromechanical switch, and
      the bypass switch is configured to switch between an open state and a closed state based on an enable signal; and
   a controller operatively coupled to the relay and the bypass switch, the controller configured to stop delivering the electrical current to the load, wherein to stop delivering the electrical current to flow to the load the controller is configured to:
      at a first time, generate the enable signal to the bypass switch to cause the bypass switch to switch from the open state to the closed state, wherein the bypass switch is configured to carry some of the electrical current to the load through the second current path;
      at a second time subsequent to the first time cause the electromechanical switch to switch to the open state, wherein the bypass switch is configured to carry the electrical current to the load through the second current path; and
      at a third time subsequent to the second time, maintain the bypass switch in the closed state before causing the bypass switch to switch back from the closed state to the open state based on the enable signal, wherein causing the bypass switch to switch back to the open state prevents damage to the bypass switch.

2. The relay assembly of claim 1, wherein the controller is configured to enable the electrical current to flow to the load, wherein to enable the electrical current to flow to the load, the controller is configured to:
   generate the enable signal to switch the bypass switch from the open state to the closed state;
   after causing the bypass switch to close, switch the electromechanical switch from the open state to the closed state; and
   after the electromechanical switch begins to carry the electrical current to the load, switch the bypass switch back to the open state, based on the enable signal from the controller.

3. The relay assembly of claim 1, wherein the controller is configured to switch the bypass switch and the electromechanical switch without regard to a current amplitude of the electrical current.

4. The relay assembly of claim 1, wherein the relay includes a latching relay.

5. The relay assembly of claim 1, wherein the controller is configured to maintain the bypass switch in the closed state for less than 1 second before switching back to the open state.

6. The relay assembly of claim 1, wherein the controller is configured to maintain the bypass switch in the closed state for less than 100 milliseconds before switching back to the open state.

7. The relay assembly of claim 1, wherein the bypass switch comprises a TRIAC.

8. A relay assembly for controlling a load, wherein the load includes a power input that has a first terminal and a second terminal, the relay assembly comprising:
   a first relay comprising a first current path, the first current path including a first switch configured to switch between an open state and a closed state for switching electrical current to the first terminal of the load;

a second relay comprising a second current path, the second current path including a second switch configured to switch between an open state and a closed state for switching the electrical current to the second terminal of the load;

a bypass switch comprising a third current path, wherein:
the bypass switch is bi-directional;
the bypass switch is operatively coupled in parallel with the first switch of the first relay, and
the bypass switch is configured to switch between an open state and a closed state based on an enable signal;

a controller operatively coupled to the first relay, the second relay and the bypass switch, the controller configured to stop delivering the electrical current to the load, wherein to stop delivering the electrical current to flow to the load comprises:
at a first time, generate the enable signal to cause the bypass switch to switch from the open state to the closed state, wherein the bypass switch is configured to carry some of the electrical current flowing to the load through the third current path separate from the first current path and the second current path,
at a second time subsequent to the first time cause the first switch of the first relay to switch from the closed state to the open state, wherein the bypass switch is configured to carry the electrical current through the third current path to the load and the second switch is configured to return the electrical current from the load through the second current path;
at a third time subsequent to the second time, maintain the bypass switch in the closed state before causing the bypass switch to switch back from the closed state to the open state, wherein causing the bypass switch to switch back to the open state prevents damage to the bypass switch.

9. The relay assembly of claim 8, wherein the controller is configured to enable the electrical current to flow to the load, wherein to enable the electrical current to flow to the load comprises:
generate the enable signal to switch the bypass switch from the open state to the closed state;
after causing the bypass switch to close, switch the first switch of the first relay from the open state to the closed state; and
after the electromechanical switch begins to carry the electrical current to the load, switch the bypass switch back to the open state, based on the enable signal from the controller.

10. The relay assembly of claim 8, wherein the first switch of the first relay includes an electromechanical switch.

11. The relay assembly of claim 8, wherein the controller is further configured to cause the second switch of the second relay to switch from the closed state to the open state at a fourth time subsequent to the third time after switching the bypass switch from the closed state to the open state.

12. The relay assembly of claim 8, wherein the first relay is a latching relay.

13. The relay assembly of claim 9, wherein the controller is configured to switch the second switch of the second relay between the open state and closed state when the first switch of the first relay and the bypass switch are both in their open state.

14. The relay assembly of claim 8, wherein the controller is configured to maintain the bypass switch in the closed state for less than 1 second before switching back to the open state.

15. The relay assembly of claim 8, wherein the controller is configured to maintain the bypass switch in the closed state for less than 100 milliseconds before switching back to the open state.

16. The relay assembly of claim 8, wherein the bypass switch comprises a TRIAC.

17. A method for switching a current to a load using a relay, the method comprising:
stopping electrical current to the load by, during a first time period, temporarily closing a bypass switch to open a bypass current path to the load that bypasses an electromechanical switch in a main current path of the relay,
wherein the bypass switch carries some of the electrical current to the load,
wherein the bypass switch receives an enable signal,
wherein the main current path is in parallel to the bypass current path, and
wherein the bypass switch is bidirectional;
during a second time period subsequent to the first time period, switching the electromechanical switch between an closed state and a open state, such that the bypass switch carries the electrical current to the load; and
during a third time period subsequent to the second time period, wherein the third time period begins when the electromechanical switch has switched between the closed state and the open state, maintaining the bypass switch in a closed state based on the enable signal, before opening the bypass switch to prevent current from flowing through the bypass current path to the load.

18. The method of claim 17, further comprising:
enabling the electrical current to flow to the load by generating an enable signal to switch the bypass switch from the open state to the closed state;
after causing the bypass switch to close, switching the electromechanical switch in the main current path of the relay from the open state to the closed state; and
after the electromechanical switch begins to carry the electrical current to the load, switching the bypass switch back to the open state, based on the enable signal from the controller.

19. The method of claim 17, wherein subsequent to the third time period the electromechanical switch is open and no current travels to the load through the main current path or the bypass current path.

\* \* \* \* \*